(12) United States Patent
Magri et al.

(10) Patent No.: US 9,485,553 B2
(45) Date of Patent: Nov. 1, 2016

(54) PATH COMPUTATION IN WAVELENGTH SWITCHED OPTICAL NETWORKS

(75) Inventors: Roberto Magri, Parma (IT); Piero Castoldi, Vicopisano (IT); Filippo Cugini, Fidenza (IT); Francesco Paolucci, Pisa (IT); Nicola Sambo, Livorno (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 14/343,545

(22) PCT Filed: Nov. 3, 2011

(86) PCT No.: PCT/EP2011/069303
§ 371 (c)(1),
(2), (4) Date: Jun. 30, 2014

(87) PCT Pub. No.: WO2013/034201
PCT Pub. Date: Mar. 14, 2013

(65) Prior Publication Data
US 2014/0328587 A1 Nov. 6, 2014

(30) Foreign Application Priority Data

Sep. 8, 2011 (EP) ..................................... 11180516

(51) Int. Cl.
*H04B 10/00* (2013.01)
*H04Q 11/00* (2006.01)
(Continued)

(52) U.S. Cl.
CPC ....... *H04Q 11/0066* (2013.01); *H04J 14/0271* (2013.01); *H04L 45/62* (2013.01); *H04Q 2011/0073* (2013.01); *H04Q 2011/0083* (2013.01)

(58) Field of Classification Search
CPC .............. H04Q 11/0066; H04Q 2011/0073; H04Q 2011/0083; H04Q 11/00; H04B 10/0793; H04B 10/07953; H04B 10/0795; H04B 10/0775; H04B 10/27; H04B 10/0799; H04J 14/02; H04J 14/0257; H04J 14/0258; H04J 14/0267; H04J 14/0269; H04J 14/0284; H04J 14/0227; H04J 14/0271; H04J 14/0238; H04J 14/0241; H04J 14/0212; H04J 14/0268; H04L 45/62; H04L 45/00
USPC ......................................... 398/57, 25–28, 45
See application file for complete search history.

(56) References Cited

U.S. PATENT DOCUMENTS 8,131,873 B2 * 3/2012 Vasseur ................... H04L 45/04
709/203
8,396,364 B2 * 3/2013 Lee ..................... H04J 14/0256
398/25

(Continued)

FOREIGN PATENT DOCUMENTS

EP        2063585        5/2009

OTHER PUBLICATIONS

Lee, et al., "PCEP Extension for WSON Routing and Wavelength Assignment, draft-lee-pce-wson-rwa-ext-01.txt", *Network Working Group Internet Draft, IETF*, (Mar. 4, 2011), 20 pages.

(Continued)

*Primary Examiner* — Hibret Woldekidan
(74) *Attorney, Agent, or Firm* — Nicholson De Vos Webster & Elliot LLP

(57) ABSTRACT

A path computation client (PCC) can request a path computation element (PCE) to compute a path across a wavelength switched optical network. PCC sends a request which identifies end nodes. The end nodes can support a plurality of possible values of a transmission parameter, such as modulation format or Forward Error Correction (FEC) type. The PCE computes a path between the end nodes and sends a reply to the PCC. The reply identifies the path between the end nodes and identifies a selected value of the transmission parameter for the computed path. The reply can comprise a spectrum assignment for the path. The reply can be a PCE Communication Protocol (PCEP) Reply message.

14 Claims, 10 Drawing Sheets

(51) Int. Cl.
*H04L 12/721* (2013.01)
*H04J 14/02* (2006.01)

(56) References Cited

U.S. PATENT DOCUMENTS

| | | | | |
|---|---|---|---|---|
| 8,433,192 B2* | 4/2013 | Frankel | .............. | H04B 10/0795 398/16 |
| 8,576,720 B2* | 11/2013 | Cugini | .................... | H04L 45/00 370/238 |
| 8,644,325 B2* | 2/2014 | Iovanna | .................. | H04L 45/00 370/401 |
| 8,873,948 B2* | 10/2014 | Caviglia | ............. | H04J 14/0227 398/17 |
| 9,077,481 B2* | 7/2015 | Sambo | | |
| 9,236,972 B2* | 1/2016 | Lee | .......... | H04L 45/00 |
| 9,312,914 B2* | 4/2016 | Vassilieva | ................ | H04B 3/32 |
| 9,372,830 B2* | 6/2016 | Vassilieva | ............... | G06F 17/00 |
| 2006/0104199 A1* | 5/2006 | Katukam | ................ | H04L 12/43 370/216 |
| 2008/0298805 A1* | 12/2008 | Lee | ..................... | H04J 14/0227 398/48 |
| 2009/0110395 A1* | 4/2009 | Lee | ................... | H04Q 11/0062 398/48 |
| 2010/0202773 A1 | 8/2010 | Lee et al. | | |
| 2010/0220996 A1* | 9/2010 | Lee | ..................... | H04J 14/0227 398/25 |
| 2011/0199939 A1* | 8/2011 | Zi | .......................... | H04L 45/42 370/254 |
| 2015/0043907 A1* | 2/2015 | Cavaliere | ............ | H04J 14/0247 398/30 |
| 2015/0139652 A1* | 5/2015 | Bottari | ................ | H04J 14/0256 398/79 |
| 2015/0256253 A1* | 9/2015 | Bottari | ................ | H04J 14/0268 398/28 |
| 2015/0333824 A1* | 11/2015 | Swinkels | ............ | H04J 14/0241 398/25 |
| 2015/0333862 A1* | 11/2015 | Swinkels | ............ | H04J 14/0241 398/79 |
| 2016/0013861 A1* | 1/2016 | Ceccarelli | ........... | H04L 43/0847 398/25 |

OTHER PUBLICATIONS

PCT International Search Report for PCT Counterpart Application No. PCT/EP2011/069303, (May 14, 2012), 4 pages.

Ash, et al., "Path Computation Element (PCE) Communication Protocol Generic Requirements", *Network Working Group Request for Comments: 4657, The Internet Society*, http://www.ietf.org/rfc/rfc4657.txt, (Sep. 2006), 21 pages.

Farrel, et al., "A Path Computation Element (PCE)—Based Architecture", Network Working Group Request for Comments 4655, http://www.ietf.org/rfc/rfc4655.txt, (Aug. 2006), 40 pages.

Kozicki, et al., "Distance-Adaptive Path Allocation in Elastic Optical Path Networks", *IEICE Trans. Commun.*, vol. E94-B, No. 7, (Jul. 2011), 8 pages.

Lee, et al., "PCEP Extensions for WSON Impairments", *Network Working Group Internet Draft, Internet Engineering Task Force (IETF)*, draft-lee-pce-wson-impairments-02.txt, (Jul. 7, 2011), 19 pages.

Margaria, et al., "PCEP extensions for GMPLS", *Network Working Group Internet-Draft, Internet Engineering Task Force (IETF)*, draft-ietf-pce-gmpls-pcep-extensions-02, (Mar. 11, 2011), 39 pages.

Otani, et al., "Generalized Labels for Lambda-Switch-Capable (LSC) Label Switching Routers", *Internet Engineering Task Force (IETF) Request for Comments: 6205*, http://datatracker.ietf.org/doc/rfc6205/, (Mar. 2011), 15 pages.

Paolucci, et al., "Experimental Demonstration of Impairment-Aware PCE for Multi-Bit-Rate WSONs", *J. Opt. Commun. Netw./* vol. 3, No. 8, (Aug. 2011), 10 pages.

Sambo, et al., "Candidate Paths for Impairment-Aware PCE in 10-100 Gb/s Optical Networks", *IEEE Communications Letters*, vol. 15, No. 8, (Aug. 2011), 3 pages.

Vasseur, JP, et al., "Path Computation Element (PCE) Communication Protocol (PCEP)", *Network Working Group Request for Comments: 5440, Internet Engineering Task Force, IETF*, https://datatracker.ietf.org/doc/rfc5440/, (Mar. 2009), 87 pages.

International Preliminary Report on Patentability, Application No. PCT/EP2011/069303, dated Mar. 20, 2014, 6 pages.

First Office Action, Chinese Application No. 201180073316.8, dated Mar. 28, 2016, 20 pages.

* cited by examiner

Fig. 11

PATH COMPUTATION IN WAVELENGTH SWITCHED OPTICAL NETWORKS

CROSS-REFERENCE TO RELATED APPLICATIONS

This application is a National stage of International Application No. PCT/EP2011/069303, filed Nov. 3, 2011, which claims priority to European Application No. 11180516.4, filed Sep. 8, 2011, which are hereby incorporated by reference.

TECHNICAL FIELD

This invention relates to computation of a path in a wavelength switched optical network (WSON), to apparatus for requesting the path computation and to apparatus for performing the path computation.

BACKGROUND

A Wavelength Switched Optical Network (WSON) supports end-to-end optical paths, called lightpaths, between nodes requiring connection in the network. WSONs can be deployed across large areas and optical paths can be routed, if possible, with minimal electrical regeneration. Traffic is optically switched at intermediate nodes by Wavelength Selective Switches (WSS). Links in a WSON are operated in a Wavelength Division Multiplexed (WDM) manner, and carry traffic at a plurality of different wavelengths. When establishing a path between end nodes, the path may be assigned a particular wavelength for the entire end-to-end path between end nodes, or the path may be assigned different wavelengths on different legs of the path between end nodes if wavelength conversion is supported.

A Path Computation Element (PCE) has been defined as an entity (component, application, or network node) that is capable of computing a network path or route based on a network graph and applying computational constraints. A Path Computation Client (PCC) is a client application requesting a path computation to be performed by the PCE. The PCC and PCE communicate through the PCE communication Protocol (PCEP). PCEP operations have been defined to enable effective PCE-based path computations and, in turn, the effective use of network resources. A PCE-based architecture is described in Internet Engineering Task Force (IETF) document RFC 4655 and the PCE communication Protocol is described in RFC 4657.

In a WSON, the Path Computation Client can be an end node which wishes to establish a path across the WSON. The PCE can be located anywhere within the network, and may be within an optical switching element, a Network Management System (NMS) or Operational Support System (OSS), or may be an independent network server.

Transponders in currently deployed nodes typically adopt unique, or statically configured, transmission technologies, e.g. a unique supported modulation format per transponder.

Specific PCEP operations have been defined for WSONs. They include, for example, the capability to enable impairment-validation and routing and wavelength assignment. US 2010/0220996A1 and "PCEP Extensions for WSON Routing and Wavelength Assignment", draft-lee-pce-wson-rwa-ext-01.txt, March 2011, http://tools.ietf.org/html/draft-lee-pce-wson-rwa-ext-01 describe PCEP signalling in a WSON. These PCEP operations can send a transmission parameter such as a modulation format or a FEC type from a PCC to a PCE. These are simply used as inputs, or constraints, by the PCE and the PCE will attempt to calculate a path between the end nodes which meets the constraints.

SUMMARY

An aspect of the present invention provides a method of servicing a request for path computation at a path computation element of a wavelength switched optical network. The method comprises receiving a request from a path computation client for computation of a path between end nodes. The method comprises determining a plurality of possible values of a transmission parameter supported by the end nodes. The method comprises computing a path between the end nodes. The computing comprises selecting one of the values of the transmission parameter. The method comprises sending a reply to the path computation client. The reply identifies the path between the end nodes and the reply identifies the selected value of the transmission parameter for the computed path.

Another aspect provides method of requesting computation of a path at a path computation client of a wavelength switched optical network. The method comprises sending a request to a path computation element for computation of a path between end nodes, wherein the end nodes support a plurality of possible values of a transmission parameter. The method comprises receiving a reply from the path computation element. The reply identifies a path between the end nodes computed by the path computation element and the reply identifies a selected value of the transmission parameter for the path.

A path computation client (PCC) is provided with a value of at least one transmission parameter obtained as an outcome of the path computation performed by the path computation element (PCE). The selected value of the one or more transmission parameter can be communicated to the PCC in a PCE Communication Protocol (PCEP) Reply message.

The transmission parameter can be modulation format. Some possible values of the modulation format transmission parameter are Dual Polarisation-Quadrature Phase Shift Keying (DP-QPSK) and Dual Polarisation-16 Quadrature Amplitude Modulation (DP-16 QAM). Other values can be used. The configuration of a different modulation format typically requires the reservation along the path of a different amount of spectrum resources. This can also cause a different performance, in terms of the supported optical reach. In general, the more efficient a modulation format is in terms of bandwidth, the more critical the optical reach.

Another possible transmission parameter is Forward Error Correction (FEC) type. Different FEC types require a different amount of data overhead, i.e., a different line-rate and different required spectrum resources. However, different FEC types also enable a different level of quality of transmission (e.g., acceptable Bit Error Rate pre-FEC), with direct implications in the optical reach.

The method is particularly suitable for WSONs with flexible transponders where transmission parameters (e.g. modulation format and/or FEC type) can be dynamically configured according to the required optical reach and to the specific link or path impairment characteristics.

An advantage of an embodiment is that it is possible to determine an adequate quality of transmission while using a value of a transmission parameter which is more efficient, for example, in terms of bandwidth usage. This allows a more optimal use of spectrum resources in a flexible wavelength switched optical network.

The PCE can determine a result to meet an objective function, such as minimisation of the required spectrum resources given a certain quality of transmission target. The objective function can be statically configured at the PCE. Alternatively, the objective function can be communicated to the PCE within the PCEP Request.

The value of the transmission parameter (e.g. optimal modulation format and FEC type) communicated to the PCC is applied in nodes of the WSON to establish the path.

The PCE can be located anywhere within the network, and may be within an optical switching element, a Network Management System (NMS) or Operational Support System (OSS), or may be an independent network server.

The optical network can use optical orthogonal frequency division multiplexing (OFDM) or single carrier transmission technologies.

Further aspects of the invention provide apparatus for performing any of the described or claimed steps of the methods.

An aspect of the invention provides a path computation element (PCE) for use in a wavelength switched optical network. The PCE comprises an interface for communicating with a path computation client (PCC). The PCE comprises a processor arranged to receive a request from the path computation client via the interface for computation of a path between end nodes, the end nodes supporting a plurality of possible values of a transmission parameter. The processor is arranged to determine a plurality of possible values of a transmission parameter supported by the end nodes. The processor is arranged to compute a path between the end nodes, wherein the computing of a path comprises selecting one of the values of the transmission parameter. The processor is arranged to send a reply via the interface. The reply identifies the path between the end nodes selected by the path computation element and the reply identifies a selected value of the transmission parameter for the path.

An aspect of the invention provides a path computation client (PCC) for use in a wavelength switched optical network. The PCC comprises an interface for communicating with a path computation element (PCE). The PCC comprises a processor arranged to send a request for computation of a path to the path computation element via the interface. The request identifies end nodes of the path. The end nodes support a plurality of possible values of a transmission parameter. The processor is arranged to receive a reply from the path computation element. The reply identifies a path between the end nodes selected by the path computation element and the reply identifies a selected value of the at least one transmission parameter for the path.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 11 shows communication between nodes of the testbed;

DETAILED DESCRIPTION

Figure 1:
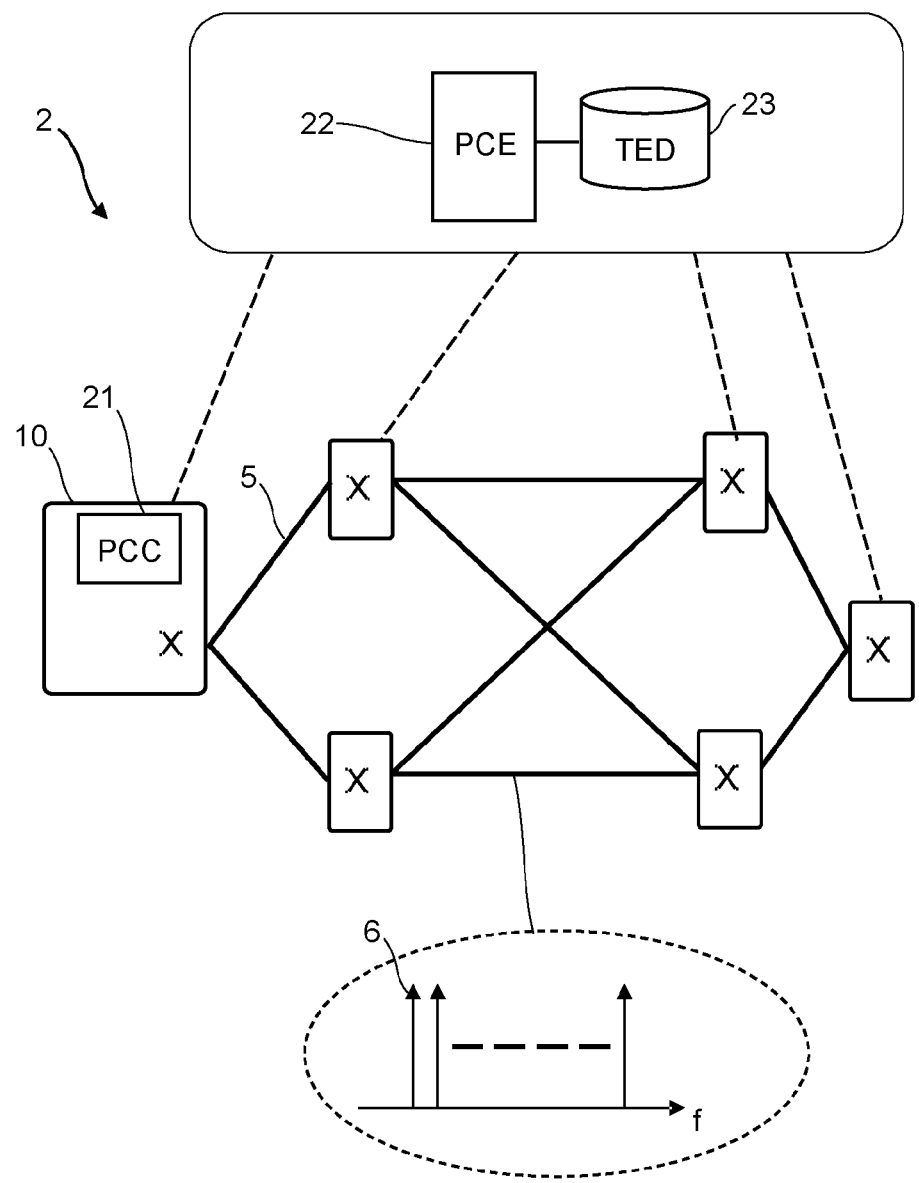
FIG. 1 shows a Wavelength Switched Optical Network (WSON)

FIG. 1 shows an example optical transmission network 2 with nodes 10, which can also be called network elements. Optical transmission links 5 connect nodes 10. Traffic is carried on links 5 by wavelength channels 6, called lambdas. Connections or lightpaths are established in the network 2. Each lightpath is established between a pair (or more) of nodes 10 of the network 2. The terms "connection" and "lightpath" will be used interchangeably. A lightpath can pass via intermediate nodes. Each node has network interfaces for optically transmitting traffic on lambdas and for optically receiving traffic on lambdas. A node 10 connects to multiple links 5 and can comprise a flexible wavelength selective switch (WSS), e.g. a bandwidth-variable optical cross connect (BV-OXC). At a node 10, traffic is received at a network interface on a lambda of an ingress link 5, the traffic is forwarded to a required egress network interface, and is transmitted on a lambda of an egress link 5. A node 10 can forward traffic to other nodes 10 of network 2, or can add traffic received from other nodes not forming part of network 2, or drop traffic to other nodes not forming part of network 2.

The network 2 also comprises entities called a Path Computation Client (PCC) 21 and a Path Computation Element (PCE) 22. A Path Computation Client (PCC) submits a request to the PCE to compute a path. The PCE 22 services requests from PCCs. The PCE is arranged to compute a routing between end nodes and replies to the PCC with the selected path. Advantageously the PCE can also perform spectrum assignment and Impairment Validation (IV) for the requested lightpath. The combined functions of Routing and Spectrum Assignment are called (RSA). A PCE which performs combined Routing and Spectrum Assignment and Impairment Validation will be abbreviated to IV&RSA. The PCE can use a Traffic Engineering Database (TED) 23. The TED 23 can store information about spectrum resource availability (e.g. reservable frequency slots) to help the PCE select resources which are available. Information to verify the optical feasibility of a lightpath in an impairment aware PCE can also be stored in the TED 23, or in another database accessible by the PCE 22.

The Path Computation Engine (PCE) 22 can be centralised at a node of the network, or the functionality can be distributed among a plurality of nodes of the network. Similarly, the TED can be centralised or distributed. The PCE 22 can form part of the Network Management System (NMS). The PCC 21 can be located at a node 10, as shown in FIG. 1, but can be located at any part of the network 2.

Figure 2:
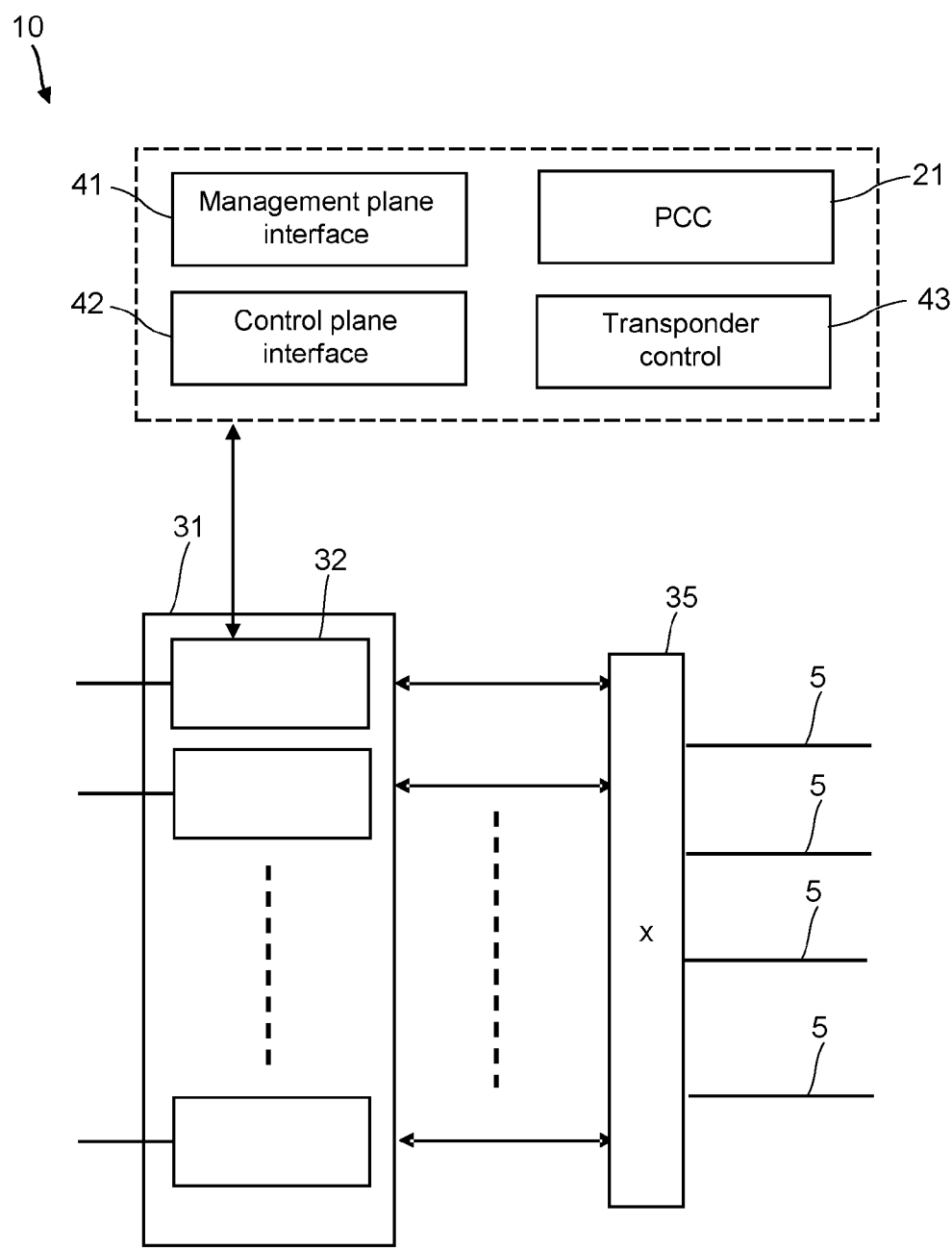
FIG. 2 shows a node of the WSON of FIG. 1.

FIG. 2 shows an example form of one of the end nodes 10 in the optical transmission network 2 of FIG. 1. An optical interface 31 comprises a set of transponders 32. A transponder 32 is arranged to modulate an optical carrier signal with data using one of a range of possible modulation formats. The operating wavelength of the transponder 32 can be configured from a range of possible wavelengths. A variable bandwidth optical cross connect (BV-OXC) 35 multiplexes a set of different wavelength signals in the transmit direction and demultiplexes a set of wavelength signals in the receive direction, according to their spectrum occupation. A BV-OXC can handle a variable amount of bandwidth per channel, e.g. 25 GHz bandwidth for channel 1, 75 GHz for an adjacent channel 2, etc. The variable bandwidth optical cross connect (BV-OXC) 35 can also switch through traffic between links 5 in the optical domain. Bi-directional operation can be supported by separate lambdas for forward and reverse transmission directions. Advantageously, separate links 5 are used for each transmission direction. Transponders may support transmission or reception at one or more bitrates, such as 2.5 Gb/s, 10 Gb/s, 40 Gb/s, 100 Gb/s 200 Gb/s. Future systems may use higher bitrates. Transponders may support transmission or reception using one or more modulation formats, such as On-Off Keying (OOK) or a phase modulation format such as Differential Quadrature Phase Shift Keying (DQPSK), Dual Polarisation-Quadrature Phase Shift Keying (DP-QPSK), Quadrature Amplitude Modulation (DP-QAM) and Dual Polarisation-Quadrature Amplitude Modulation (DP-QAM). In a flexible WSON, the transponders 32 are not constrained to a fixed grid of wavelength channels. Instead, a transponder can be assigned a number of frequency slots from a flexible grid. In this way, neighbouring traffic flows (channels) along an optical link 5 can have different bandwidths. The node 10 can have a management plane interface 41 and a control plane interface 42. Control plane signalling, such as RSVP-TE signalling, can be sent between nodes to reserve resources and establish lightpaths. A transponder control module 43 controls the configuration of a transponder 32, e.g. wavelength, bandwidth, modulation format. The transponder control module 43 communicates with the PCC 21 and the management plane interface 41 and/or the control plane interface 42 to establish values of transmission parameters to be used by the transponder 32.

In a network where nodes can selectively communicate at 100 Gb/s using a DP-16 QAM modulation scheme and at 100 Gb/s using a DP-QPSK modulation scheme, there are different spectrum occupations for these two schemes. DP-16 QAM halves the required spectrum with respect to DP-QPSK. Flexible WSONs can provide an advantage in terms of occupied spectrum resources by efficiently exploiting both: (i) flexible transponders operating with configurable advanced modulation formats and (ii) flexible optical cross-connects (OXCs) with configurable frequency slots per output port. Modulation format and flexible OXCs can be dynamically configured, according to the required optical reach, in order to minimise the spectrum utilisation.

Figure 3:
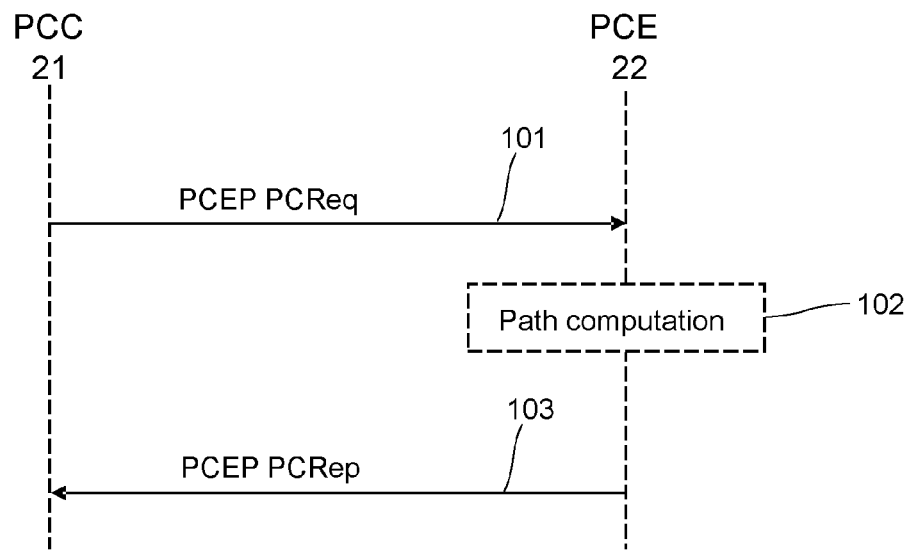
FIG. 3 shows PCEP communication between a PCC and a PCE.

FIG. 3 shows PCEP communication between PCC 21 and PCE 22. The communication comprises the PCC sending a PCEP Request message 101 to the PCE 22. PCE 22 computes 102 a path based on information received in the Request message 101. PCE 22 can also use other information, such as impairment information and information about available wavelength channels. PCE 22 then sends a PCEP Reply message 103 to the PCC 21.

Advantageously, the PCEP Request message identifies values of a transmission parameter supported by the end nodes of the requested path. Alternatively, other techniques could be adopted to provide this information to the PCE 22, such as out-of-band communications or listening to specific routing protocol extensions which carry this information.

Figure 4:
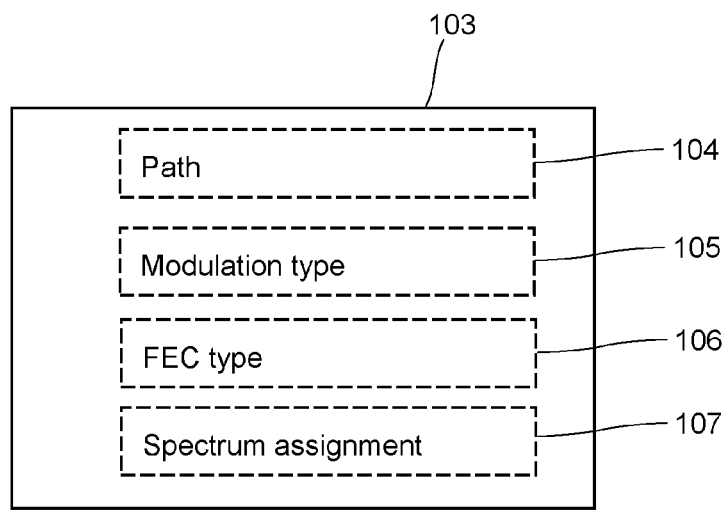
FIG. 4 shows a message used in FIG. 3.

FIG. 4 schematically shows elements of the PCEP reply message 103. The message 103 can comprise: information 104 identifying the path selected by the PCE: information 105 identifying the modulation type selected by the PCE; information 106 identifying the FEC type selected by the PCE; and information 107 identifying the spectrum assignment selected by the PCE. The information 105-107 can be carried as extensions of the PCE Protocol (PCEP). For example, information element 105 can identify a selected value of modulation format by including a numerical code which identifies the modulation format, or by using a binary field where each binary digit represents a different modulation format and a particular one of the digits is set to "1" to indicate the modulation format that is selected. Similar techniques can be used to identify the selected FEC type 106. One exemplary way of indicating the spectrum assignment 107 is described later with reference to FIG. 11.

An example scenario of operating a WSON will now be described with reference to FIG. 5. The WSON comprises nodes 1-8. Intermediate nodes have bandwidth-variable optical cross-connects.

When a path computation request is generated by a PCC (e.g. located at the ingress node 1), a PCEP PCReq message is received at the IV&RSA PCE 22. The PCEP PCReq messages identifies the source s and destination d as end points and a requested bit-rate of 100 Gb/s. In addition, the indication of two supported modulation formats is provided: DP-16 QAM and DP-QPSK. These are modulation formats supported by the transponders at nodes 1 and 2. The IV&RSA PCE 22 computes the set Ps,d of shortest paths given a certain metric (e.g. hop count). A quality of transmission (QoT) metric such as optical signal to noise ratio (OSNR) is also estimated for each path within Ps,d and compared with OSNR threshold values, one per modulation format, such that a bit error rate (BER) of, for example, $10^{-3}$ is guaranteed (coherent detection and forward error correction (FEC) are considered at the receiver).

Figure 5:
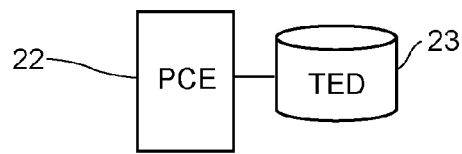
FIG. 5 shows an example topology of a WSON.
Figure 5:
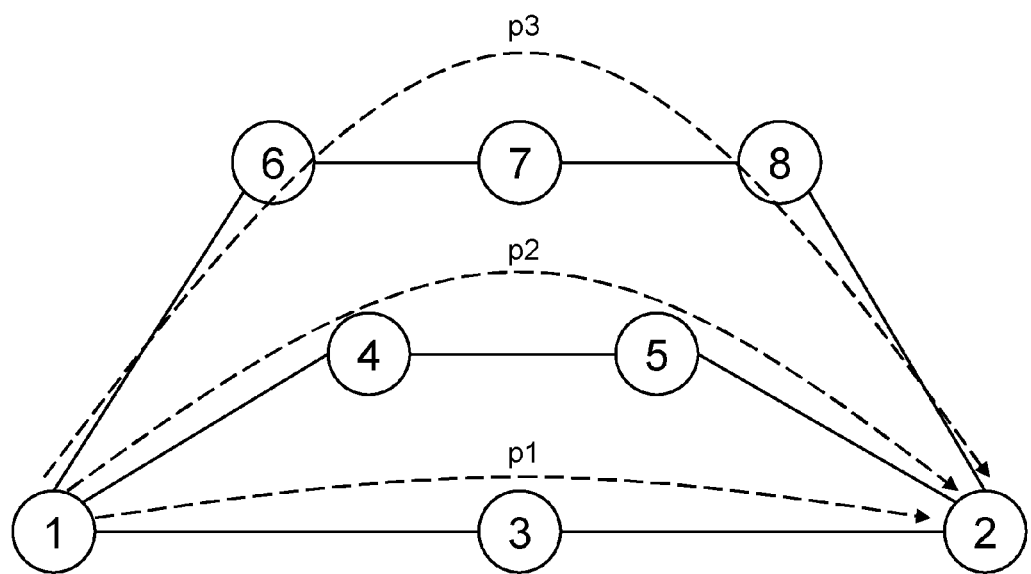

In the network of FIG. 5 there are three different possible paths between node 1 and node 2. The PCE is aware of transmission performance of these paths, such as by using information in the TED 23. The first path p1 will experience a received Optical Signal to Noise Ratio (OSNR) of around 33 dB. The second path p2 has a received OSNR of 26 dB. Finally, the third path p3 has a received OSNR of 19 dB. These OSNR values are computed accounting for the noise of each link: they represent the OSNR requirements that should be guaranteed.

Different modulation schemes have different requirements. DP-16 QAM halves the required spectrum compared to DP-QPSK, but requires a higher OSNR.

The values of the transmission parameter (e.g. modulation format) are considered. With DP-QPSK modulation at 100 Gb/s, all three paths p1, p2, p3 can be successfully set up. In particular, OSNR margins of 16, 9 and 2 dB are experienced for paths p1, p2 and p3 respectively (w.r.t required OSNR at BER=$10^{-3}$). With DP-16 QAM modulation at 100 Gb/s, BER remains below BER=$10^{-3}$ along paths p1 and p2 (with OSNR margins of 9 and 2 dB respectively) while path p3 in this case is unfeasible.

Along path p1, also considering the available margins, DP-16 QAM modulation can be safely configured with half the bandwidth occupation of DP-QPSK.

Figure 10:
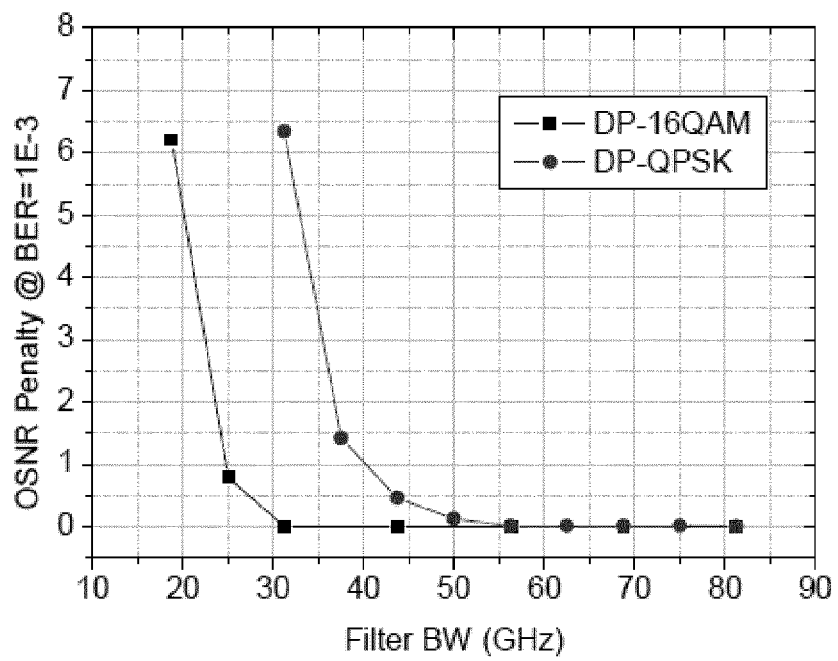

If a sufficient OSNR margin (with respect to threshold) is present, it is determined if narrow filtering can be applied to further reduce the bandwidth of the signal. The bandwidth can be determined in terms of a required number of frequency slots of a flexible grid. Referring to FIG. 10, a DP-16 QAM signal can be perfectly handled (no penalties) with a bandwidth of 32 GHz. With a bandwidth of 25 GHz, around 1 dB of penalty is experienced. Considering a particular link, if the difference between the link OSNR and the OSNR threshold is larger than 1 dB, it is possible to apply narrow filtering. In the example just described it is possible to reserve a bandwidth of 25 GHz along the link rather than the theoretically required 32 GHz.

The path requiring the minimum number of frequency slots is selected. The PCE identifies path p1 and DP-16 QAM as the optimal path and modulation format, since BER remains below threshold and the occupied spectrum resources are minimised. At this point, the PCE communicates to the PCC using a PCEP PCRep message. This message can identify the selected path by an Explicit Route Object (ERO). The message also includes the selected modulation format and frequency slots. In this example, the message indicates path p1 as the selected path, a value indicating the required spectrum resources, and an indication of DP-16 QAM as the selected modulation format.

Other transmission parameters can be considered by the PCE at the time of path computation. Additional parameters can include FEC type and possibly the optical output power (e.g. which maximises the overall optical reach accounting for OSNR and nonlinear effects). Any additional selected parameters are returned to the PCC in the PCEP PCRep message.

Another scenario will now be described. This scenario is suitable for protection strategies guaranteeing just a percentage of working resources. Flexible transponders enable the transmission of the same modulation format at two given bit-rates. Signals at 200 Gb/s and 100 Gb/s DP-16 QAM are considered. They require different spectrum occupations. In particular, 100 Gb/s DP-16 QAM halves the required spectrum with respect to 200 Gb/s DP-16 QAM. However, the signal at 200 Gb/s is significantly more demanding in terms of OSNR. In this case, a connection request is generated by a PCC 21 and sent as a PCEP Request message to the IV&RSA PCE 22. The request message indicates source s and destination d as end points and a synchronized path computation request for two different paths. One path corresponds to the working path at a bit-rate of 200 Gb/s while the second one refers to the backup path at a bit-rate of 100 Gb/s. The two path requests are both included within a unique PCEP Synchronized Vector object (SVEC), as specified in RFC 5440. Similarly to the previous scenario, the IV&RSA PCE 22 then computes the set $P_{s,d}$ of shortest paths and related OSNR values such that both working and backup paths meet the requested indications. Finally, the IV&RSA PCE also considers OSNR margins to possibly apply narrow filtering and achieve a further reduction of occupied resources. The result of the joint path computation, achieved by minimizing the overall amount of required frequency slots, is returned to the PCC 21.

Figure 6:
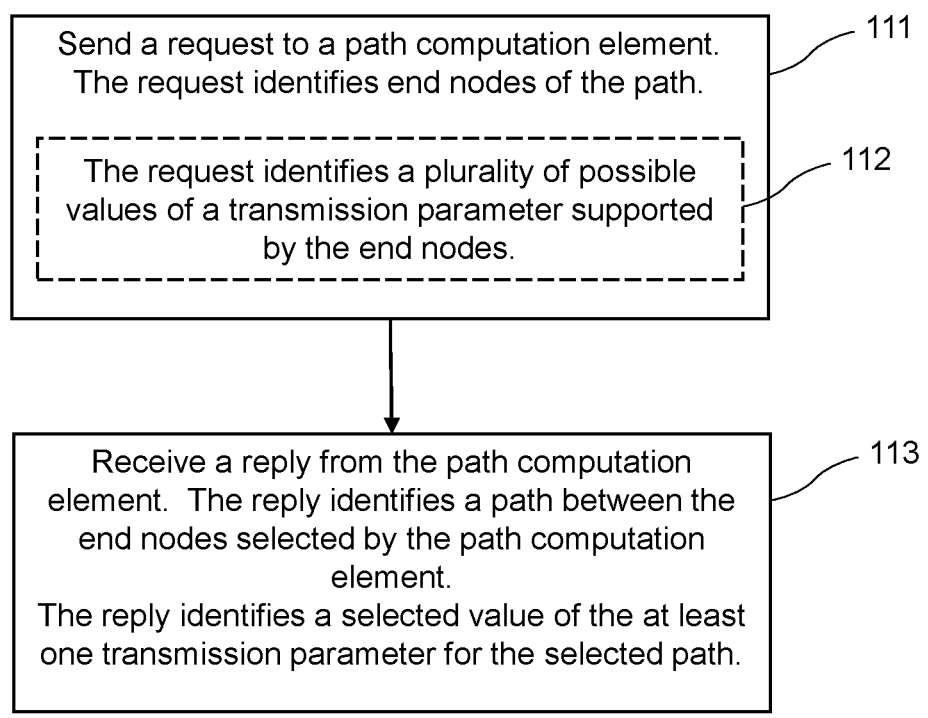
FIG. 6 shows a method performed at a PCC.

FIG. 6 shows a method performed by a PCC. At step 111 the PCC sends a request to a path computation element (PCE). The request identifies end nodes of the path. Advantageously, the request also identifies 112 a plurality of possible values of at least one transmission parameter supported by the end nodes. For example, if the transmission parameter is modulation format, the request can carry an information element which identifies supported modulation formats. This can be achieved in various ways, such as by using a numerical code to represent a value of a supported modulation format, or by including a binary field where each binary digit represents a different modulation format and a digit is set to "1" to indicate the modulation format is supported or set to "0" to indicate the modulation format is not supported. At step 113 the PCC receives a reply from the path computation element. The reply identifies a path between the end nodes selected by the path computation element. The reply identifies a selected value of the at least one transmission parameter for the selected path.

Figure 7:
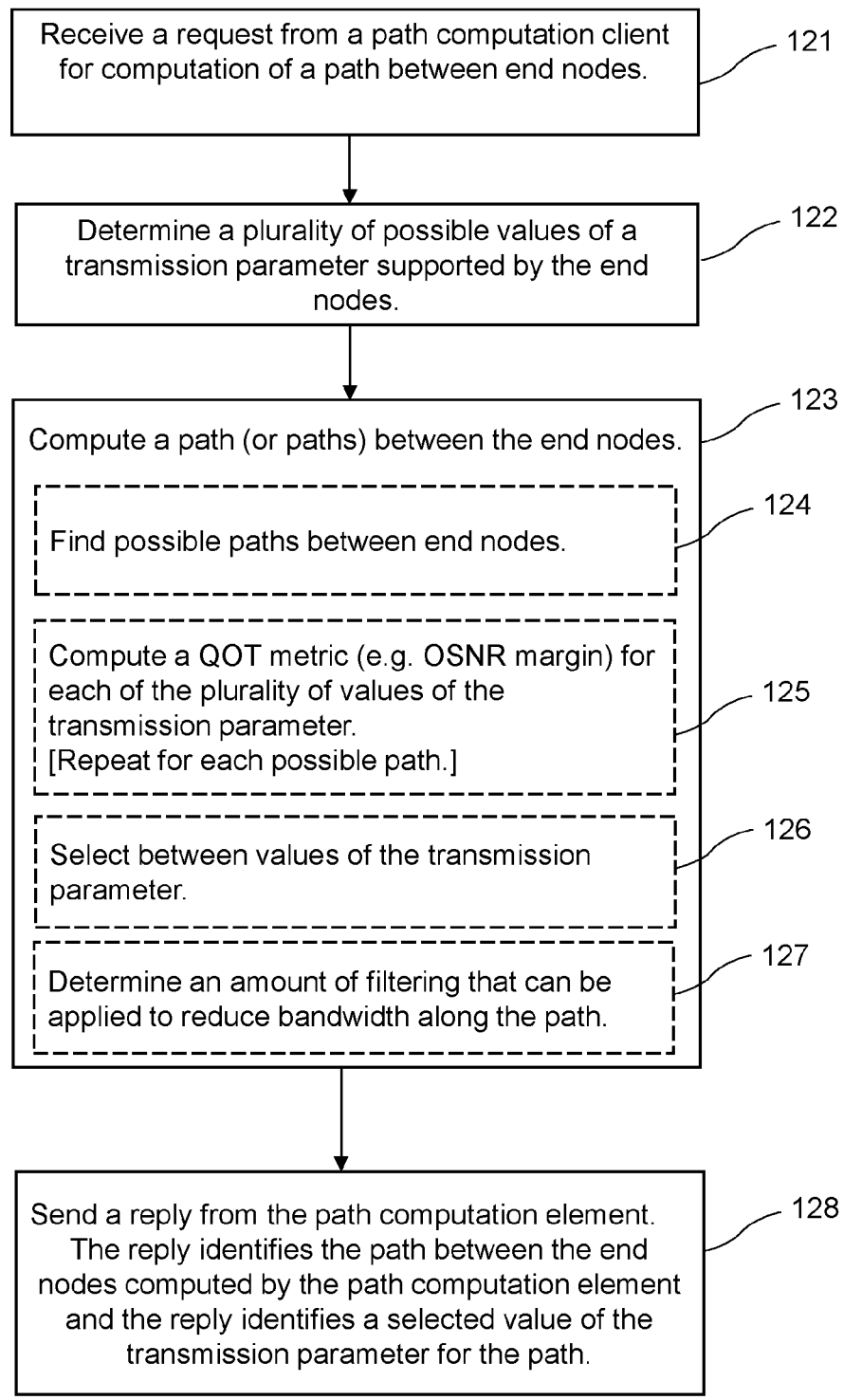
FIG. 7 shows a method performed at a PCE.

FIG. 7 shows a method performed by a PCE. At step 121 the PCE receives a request from the path computation client for computation of a path. The request identifies end nodes of the path. At step 122 the PCE determines a plurality of possible values of a transmission parameter supported by the end nodes. Advantageously, the request received at step 121 identifies the plurality of possible values of the transmission parameter supported by the end nodes and step 122 uses the values received in the request. At step 123 the PCE computes a selected path between the end nodes. Step 123 can include one or more of the additional steps 124-127. At step 124 the PCE finds possible paths between the end nodes. There may be just a single possible path, or a plurality of possible paths. At step 125 the PCE determines a Quality of Transmission metric (e.g. OSNR margin) for each of the plurality of values of the transmission parameter (and for each of the possible paths). This can be performed in two stages. Firstly, the PCE computes an expected OSNR for a path and then compares the OSNR with a target OSNR threshold (to achieve a particular BER, such as $10^{-3}$) for each value of the transmission parameter. The amount by which a computed OSNR exceeds a threshold value is an OSNR margin. For example, step 125 can determine an OSNR margin for a DP-QPSK modulation format and an OSNR margin for a DP-16 QAM modulation format. If more than one value of the transmission parameter offers an acceptable quality of transmission metric, or if more than one path offers at least one value of the transmission parameter with an acceptable quality of transmission metric, step 126 selects between possible values of the transmission parameter. An objective function can be used to make the selection. At step 127 the PCE determines if it is possible to apply filtering to reduce the amount of spectral occupation of the signal. Applying filtering will reduce the OSNR margin, as shown in FIG. 10. At step 128 the PCE sends a reply from the path computation element. The reply identifies a path between the end nodes selected by the path computation element and the reply identifies a selected value of the at least one transmission parameter for the selected path.

Figure 8:
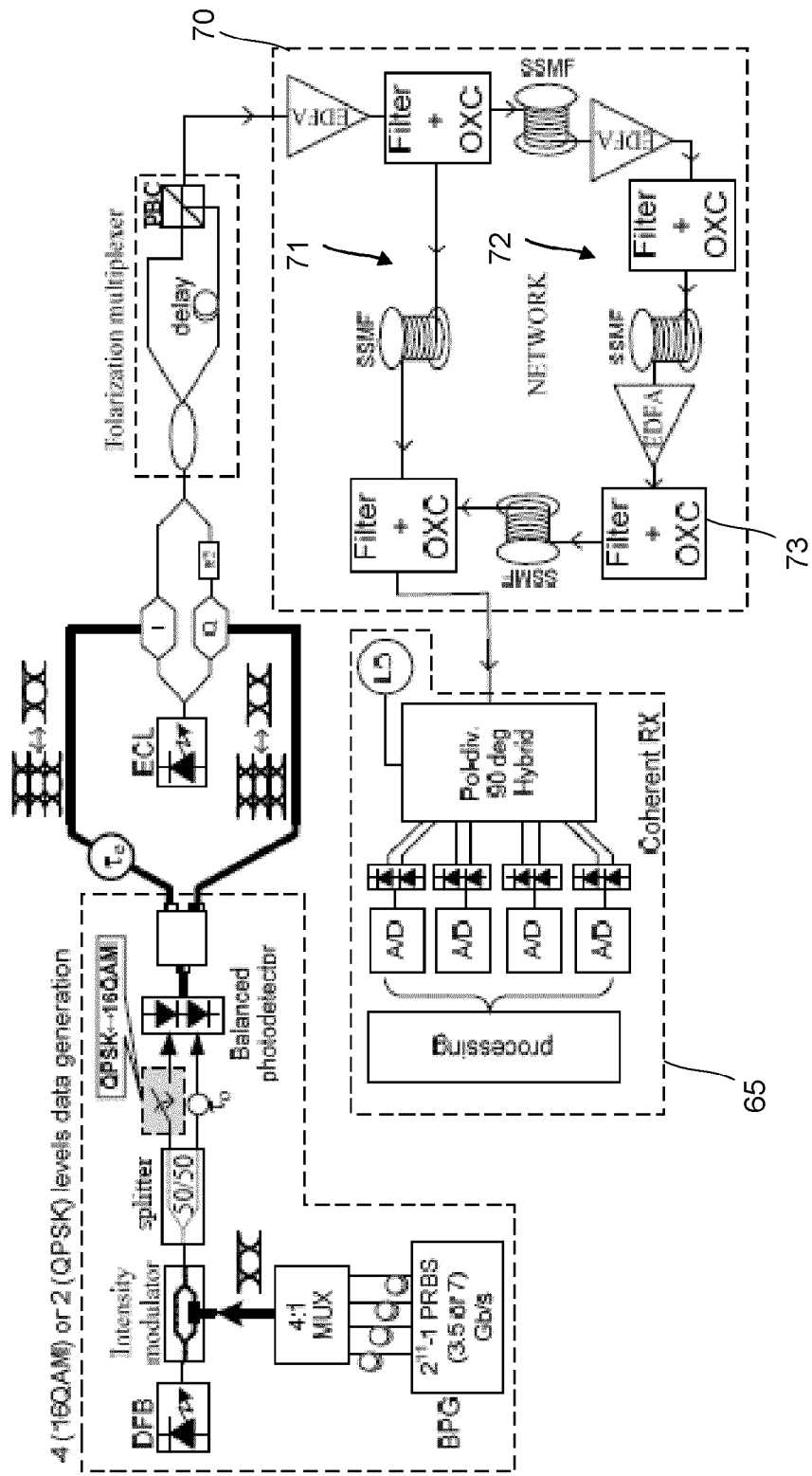
FIG. 8 shows a testbed WSON.

The PCE returns both the computed path and the selected modulation format, such that the frequency slot occupation is minimised along the selected path. The PCE has been experimented in a real testbed performing dynamic rerouting with frequency slot assignment and format adaptation from DP-16 QAM to DP-QPSK at 100 Gb/s. FIG. 8 shows an experimental testbed of a flexible WSON with an IV&RSA PCE. The testbed implements DP-QPSK and DP-16 QAM 112 Gb/s (100 Gb/s plus overhead) signal generation through a tunable external cavity laser (ECL) with a line-width of about 100 KHz, modulated using an integrated LiNbO3 double nested Mach Zehnder modulator. The modulation format can be selected by driving the in-phase (I) and the quadrature (Q) branches of the modulator with a 2-level (QPSK) or a 4-level (16 QAM) electrical signal. The 4-level electrical signal is obtained by adding two 2-level signals with proper delay and amplitudes. The adding operation is performed in the optical domain and a reconfigurable scheme is obtained as depicted in FIG. 8. In particular, a DFB laser is intensity modulated by a 28 (QPSK) or 14 Gb/s (16 QAM) pseudo random bit sequence (PRBS) of length 211-1, obtained by multiplexing four binary sequences at 3.5 or 7 Gb/s. Two replicas of the optical signal are obtained through a 50/50 splitter, differentially delayed by an integer number of symbol periods ($\tau_o$), and photodetected by a balanced photodetector (adding operation). An optical shutter is also exploited in one of the two splitter arm, in order to generate at the photodetector output a 4-level (shutter off with 3 dB attenuation) or a 2-level (shutter on) electrical signal. The I and Q driving signals are finally obtained by an electrical splitter and differentially delayed by an integer number of symbol periods ($\tau_e$) before being applied to the IQ-modulator. 112 Gb/s DP-QPSK (28 Gbaud) or 112 Gb/s DP-16 QAM (14 Gbaud) transmission is obtained by emulating polarization multiplexing through a 50/50 beam splitter, an optical delay line, and a polarization beam combiner (PBC). The transmitter configuration is performed by controlling the shutter status and the bit pattern generator (BPG) rate.

At the receiver 65, a coherent detection strategy is applied. Transmitter and receiver are connected through two disjoint paths 71, 72. The first (short) path 71 is composed of a 80 km-long standard single mode fiber (SSMF) link, with a received OSNR of 30 dB. The second (long) path 72 comprises three SSMF links, with a total length of 240 km and a received OSNR of 23.2 dB. The nodes consist of four flexible OXCs 73, each composed of a tunable filter and a MEMS switch. Each OXC 73 is controlled by a mini-PC via a dedicated RS-232 port. The ingress OXC controller also configures the modulation format at the transmitter by properly setting the optical shutter and BPG rate. Similarly, the egress OXC controller sets the proper digital processing strategy (decision rule) for QPSK or 16 QAM format at the receiver. In addition, the OXC controllers can act as PCC running PCEP for path computation requests to the PCE and implement basic RSVP-TE instance, enhanced for slot reservation. In particular, upon Resv message reception, the controller triggers the MEMS switching and tunes the filter according to the lightpath assigned frequency slots.

Figure 9:
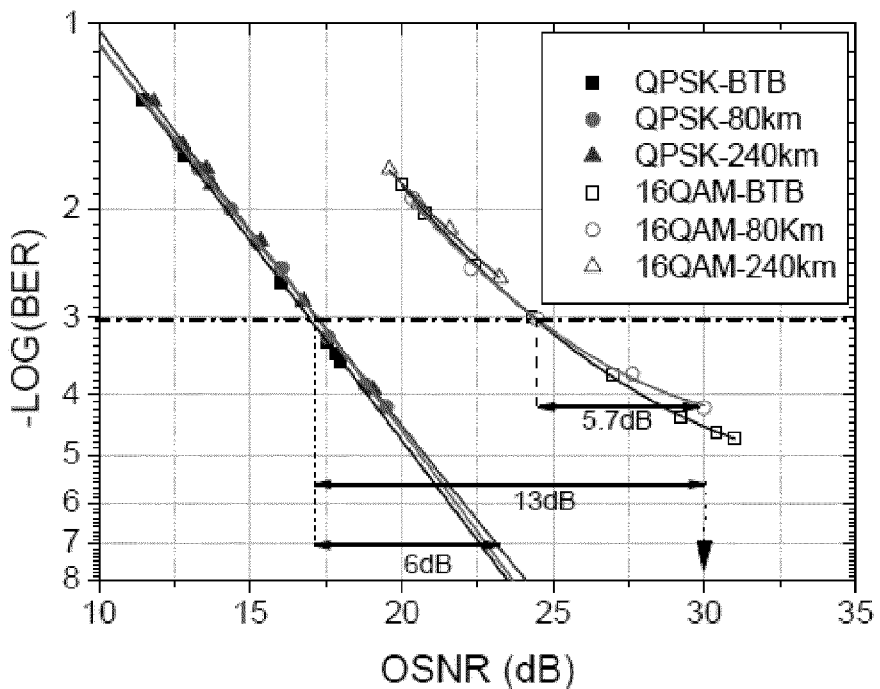
FIGS. 9 and 10 shows data obtained using the testbed of FIG. 8.

FIG. 9 shows the testbed performance for the DP-16 QAM and DP-QPSK transmissions. BER vs. OSNR measurements are carried out in back-to-back configuration and along the two possible paths. The OSNR is varied by reducing the optical launch power, and the maximum OSNR values for the short and long link (30 and 23.2 dB, respectively) are indicated as a reference. Results show that, with DP-QPSK, both the short and long paths can be successfully set up. In particular, 13 dB and 6 dB of OSNR margin (w.r.t required OSNR at BER=$10^{-3}$) are experienced along the short and long path, respectively. On the other hand, with DP-16 QAM, BER remains below 10-3 just along the short path (with a margin of 5.7 dB) while the long path results unfeasible. To show the effect of narrow filtering, FIG. 10 reports the OSNR penalty (with a BER=$10^{-3}$) experienced for different values of filter bandwidth, i.e. assigned frequency slots of bandwidth 6.25 GHz. Results show that, with DP-16 QAM, no penalty is achieved with at least 5 slots, less than 1 dB with 4 slots, and around 6 dB with just 3 slots. With DPQPSK, no penalty is achieved when at least 9 slots are allocated and a penalty of about 1.5 dB with 6 slots.

Figure 11:
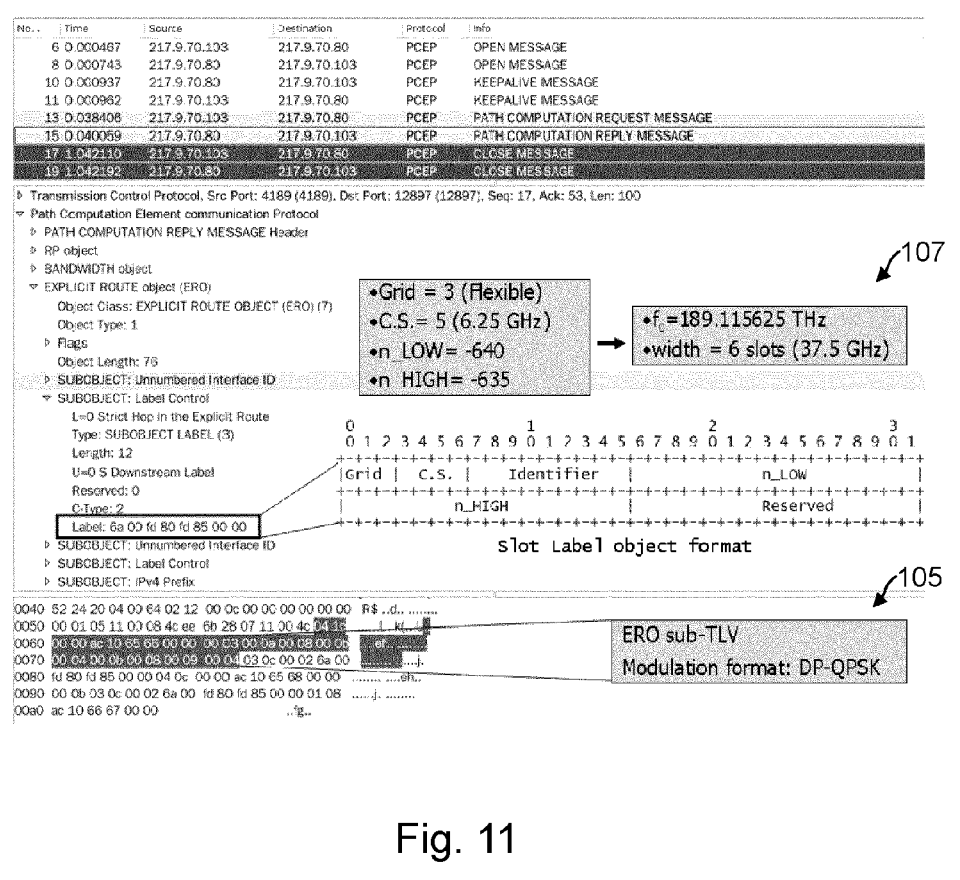

A dynamic rerouting experiment is then implemented to show the performance of the PCE architecture. A 100 Gb/s DP-16 QAM connection request was routed along the short path 71. Then, as upon a short path link disruption, the ingress OXC performs a PCEP request for a restored lightpath. FIG. 11 shows a capture of the PCEP messages exchanged between the ingress OXC (acting as PCC) and the IV&RSA PCE, both implemented in C++. The PCEP session is established through the initial Open and Keepalive messages, then a PCEP Request is submitted to the PCE (packet 13). The PCE identifies the long path as a candidate for path restoration, however it excludes the DP-16 QAM modulation format due to unacceptable ONSR, while DP-QPSK is selected as the appropriate modulation format, obtaining, as shown in FIG. 7, a satisfactory OSNR margin of 6 dB. This margin, given the penalties shown in FIG. 10, is exploited to save three frequency slots along the three links of the long path, i.e. to reduce the amount of required 6.25 GHz frequency slots from a value of 9 to a value of 6. The performed spectrum assignment is first fit and the PCE returns the first 6 adjacent frequency slots. The PCEP Reply message (packet 15) includes the ERO enclosing the assigned modulation format and FEC and the computed spectrum channel, carried by a Slot Label Object. This object is derived from T. Otani et al, "Generalized Labels for Lambda-Switch-Capable (LSC) Label Switching Routers", RFC 6205, March 2011 and includes a flexible grid specification in addition to the standard CWDM and DWDM ITU-T grids through the definition of two offsets, referred to the lower and the higher slot of the selected spectrum slice, respectively. FIG. 11 shows the object values (Flexible Grid flag, channel spacing 6.25 GHz, lower offset −640, higher offset −635). The object parameters enable the computation of the central frequency and the channel spacing of the assigned frequency slots. In this approach the designated frequency f on the ITU-T frequency grid using a channel spacing fcs and a frequency number n should be interpreted as a spectral slot having a frequency segment between $193.1 + (n \pm \frac{1}{2}) f_{cs}$ (THz). An ITU-T frequency number n corresponds to the frequency slot number. Spectral resource allocation can be represented using a number of contiguous frequency slots. The frequency segment with various widths can be specified using parameters of a slot width $f_{slot}$ which is equal to the channel spacing $f_{cs}$, the lowest frequency slot number $n_l$, and the highest frequency slot number $n_h$. Such parameters should be used in the spectral resource labelling in the signalling messages. The centre frequency $f_c$ and the width $f_w$ of the frequency segment are shown as $f_c = 193.1 + \{(n_l + n_h)/2\} f_{slot}$ (THz) and $f_w = (n_h - n_l + 1) f_{slot}$ (THz).

For the example shown in FIG. 11:

$n_l = -640$ $n_h = -635$ $f_{slot} = 6.25$ GHz$= 0.00625$ THz and $f_c = 193.1 + \{(n_l + n_h)/2\} f_{slot}$ THz $= 193.1 + \{(-640 - 635)/2\} * 0.00625$ $= 189.115625$ THz and $$f_w = (n_h - n_l + 1) f_{slot} \text{ THz}.$$

$$= (-635 + 640 + 1) * 0.00625$$

$$= 37.5 \text{ GHz}.$$

If control plane signalling is used to set up a path, the returned values can be inserted within the ERO objects of an RSVP Path Message of a subsequent signalling phase. The total IV&RSA PCE computation time is in the order of just 2 ms. A few milliseconds are required for PCEP and signalling communications as well as MEMS switching. Modulation format conversion at the transmitter and receiver is achieved through simple software operations and completed significantly before tunable filter configuration, which requires around 0.5s, in line with other commercially-available flexible OXCs. As an alternative to using the control plane for path set up, the management plane can perform path set up.

Figure 12:
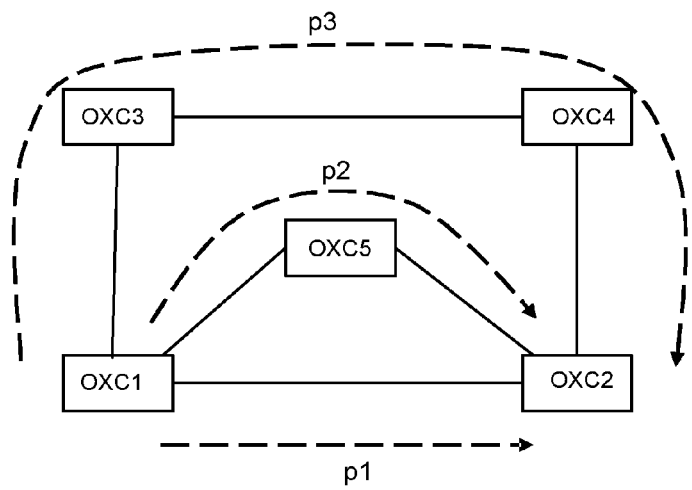
FIG. 12 shows another example topology of a WSON as a testbed.

A second experiment uses the example WSON shown in FIG. 12. A protected path between OXC1 and OXC2 is requested having just a portion of the working resources guaranteed in the backup path. To this extent, a PCEP Request message is triggered by the NMS encompassing a path request with bit-rate of 200 Gb/s (for the working path) and a second path request at 100 Gb/s (for the back-up path). The bit-rate specification of each path request is enclosed in the PCEP Generalized Bandwidth object described in C. Margaria et al, "PCEP extensions for GMPLS," IETF, draft-ietf-pce-gmpls-pcep-extensions-02, March 2011. The values enclosed in the message are: G.709 OTN traffic spec, OCh signal type at 200 Gb/s and 100 Gb/s, respectively. The two path requests are included in a single PCEP Synchronized Vector (SVEC) object having flags N, L, and S activated. This forces the PCE to jointly compute the two paths by considering as additional constraints the nodes, links and shared risk link groups (SRLG) disjointness. PCE identifies path p1 as candidate for the working connection and path p2 and p3 as possible candidates for the backup connection. In this experiment, path p1 is assumed with available resources and it is selected with the DP-16 QAM modulation format at 200 Gb/s. Among paths p2 and p3, the former (and shorter one) is selected as backup, with DP-16 QAM as the appropriate modulation format at 100 Gb/s. The 2 dB of margin experienced along both paths p1 and p2 may, or may not, be exploited by the IV&RSA PCE to further reduce the overall amount of occupied resources. In this experiment, the PCE maintains the margins to provide additional reliability. The path computation procedure is performed in about 3 ms. Both the working and backup paths are successfully established. As upon failure detection along path p1, the pre-reserved backup resources along path p2 are activated. In this case the activation of the backup path requires adaptation of the bit-rate from 200 Gb/s to 100 Gb/s, both operating with DP-16 QAM. Such adaptation is successfully performed using software operations at the transmitter and receiver.

Figure 13:
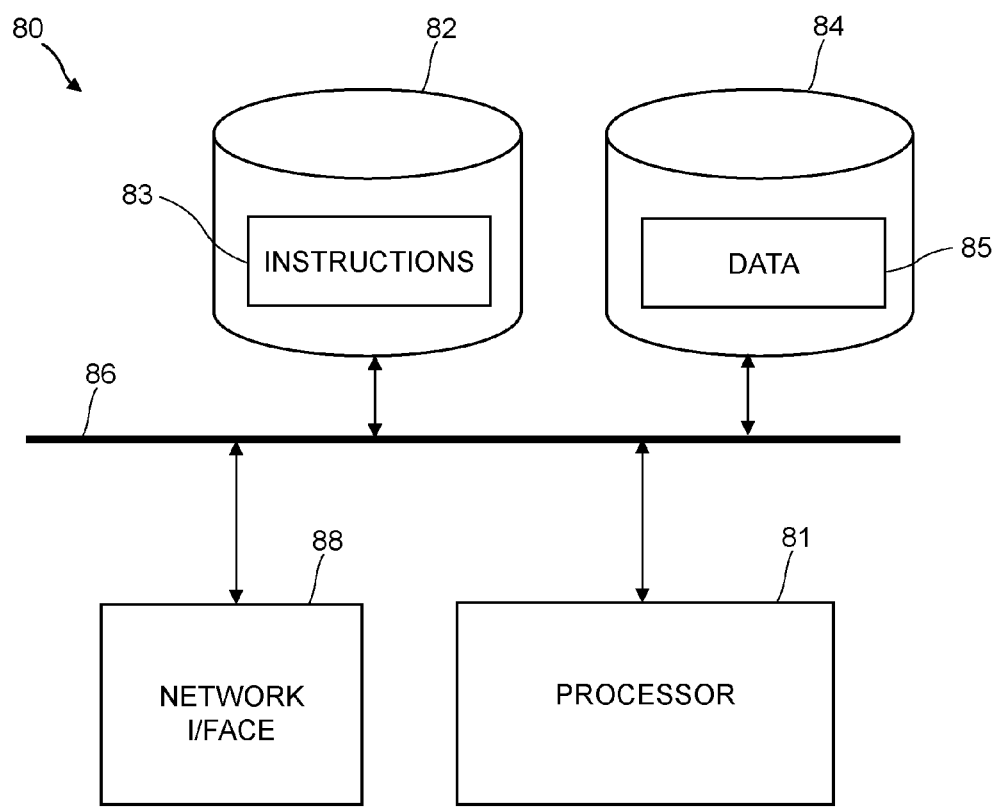
FIG. 13 shows a computer system for implementing one of the path computation entities.

FIG. 13 shows an exemplary processing apparatus 80 which may be implemented as any form of a computing and/or electronic device, and in which embodiments of the system and methods described above may be implemented. In particular, an instance of device 80 may be used to implement the PCC and an instance of device 80 may be used to implement the PCE. Processing apparatus 80 comprises one or more processors 81 which may be microprocessors, controllers or any other suitable type of processors for executing instructions to control the operation of the device. The processor 81 is connected to other components of the device via one or more buses 86. The processor-executable instructions 83 may be provided using any computer-readable media, such as memory 82. The memory is of any suitable type such as read-only memory (ROM), random access memory (RAM), a storage device of any type such as a magnetic or optical storage device. Additional memory 84 can be provided to store data 85 used by the processor 81. The processing apparatus 80 comprises one or more network interface inputs 88 for interfacing with other network entities. The processing apparatus 80 can also comprise one or more input interfaces for receiving input from a user.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for servicing a request for path computation at a path computation element in a wavelength switched optical network, the method comprising:
    receiving a request from a path computation client for computation of a path between end nodes, the request identifying the end nodes and a transmission parameter that is supported by the end nodes, the transmission parameter including a bit rate and a plurality of modulation formats;
    determining a plurality of values of the transmission parameter supported by the end nodes;
    computing one or more paths between the end nodes for the transmission parameter based on meeting a bit error rate (BER) below a set threshold, wherein the computing further comprises selecting one of the values of the transmission parameter that provides the path requiring a minimum number of frequency slots from the one or more paths computed; and
    sending a reply to the path computation client, wherein the reply identifies the path computed between the end nodes and the reply identifies the selected value of the transmission parameter for the computed path.

2. The method according to claim 1, wherein the determining the plurality of values of the transmission parameter supported by the end nodes comprises using the plurality of values of the transmission parameter.

3. The method according to claim 1, wherein computing the one or more paths between the end nodes comprises:
    computing a quality of transmission metric for each of the plurality of values of the transmission parameter; and
    selecting one of the values of the transmission parameter on a basis of the computed metrics.

4. The method according to claim 3, wherein computing the quality of transmission metric is performed for a plurality of possible paths between the end nodes, and wherein selecting one of the values of the transmission parameter is performed for the metrics obtained for the plurality of possible paths.

5. The method according to claim 3, wherein selecting one of the values of the transmission parameter is performed for minimization of bandwidth and a quality of transmission metric exceeding a target threshold value.

6. The method according to claim 3, wherein the quality of transmission metric is an optical signal to noise ratio margin.

7. The method according to claim 1, further comprising determining if filtering can be applied to reduce bandwidth along the path.

8. A method of requesting computation of a path at a path computation client in a wavelength switched optical network, the method comprising:
sending a request to a path computation element for computation of a path between end nodes, the request identifying the end nodes and a transmission parameter that is supported by the end nodes, the transmission parameter including a bit rate and a plurality of modulation formats; and
receiving a reply from the path computation element, wherein the reply is based on the path computation element determining a plurality of values of the transmission parameter supported by the end nodes, the path computation element computing one or more paths between the end nodes for the transmission parameter based on meeting a bit error rate (BER) below a set threshold, and the path computation element selecting one of the values of the transmission parameter that provides the path requiring a minimum number of slots from the one or more paths, wherein the reply identifies the path between the end nodes computed by the path computation element, and the reply identifies the selected value of the transmission parameter for the path.

9. The method according to claim 8, wherein the transmission parameter also includes
a Forward Error Correction type.

10. The method according to claim 8, wherein the reply comprises a spectrum assignment for the path.

11. The method according to claim 8, wherein the reply comprises a Path Computation Element Communication Protocol reply message comprising an element which identifies the selected value of the transmission parameter.

12. A path computation element for use in a wavelength switched optical network, the path computation element comprising:
an interface for communicating with a path computation client; and
a processor configured to:
receive a request from the path computation client via the interface for computation of a path between end nodes, the request identifying the end nodes and a transmission parameter that is supported by the end nodes, the transmission parameter including a bit rate and a plurality of modulation formats,
determine a plurality of values of the transmission parameter supported by the end nodes,
compute one or more paths between the end nodes for the transmission parameter based on meeting a bit error rate (BER) below a set threshold, wherein the computing of the path further comprises selecting one of the values of the transmission parameter that provides the path requiring a minimum number of frequency slots from the one or more paths computed, and
send a reply via the interface, wherein the reply identifies the path computed between the end nodes selected by the path computation element, and the reply identifies the selected value of the transmission parameter for the path.

13. A path computation client for use in a wavelength switched optical network, the path computation client comprising:
an interface for communicating with a path computation element; and
a processor configured to:
send a request for computation of a path to the path computation element via the interface, the request identifying end nodes of the path and a transmission parameter that is supported by the end nodes, the transmission parameter including a bit rate and a plurality of modulation formats, and
receive a reply from the path computation element, wherein the reply is based on the path computation element determining a plurality of values for the transmission parameter supported by the end nodes, the path computation element computing one or more paths between the end nodes for the transmission parameter based on meeting a bit error rate (BER) below a set threshold, and the path computation element selecting one of the values of the transmission parameter that provides the path requiring a minimum number of slots, wherein the reply identifies the path between the end nodes computed by the path computation element, and the reply identifies the selected value of the transmission parameter for the path.

14. A non-transitory machine-readable medium having instructions stored therein, which when executed by a processor, cause a path computation element to perform operations comprising:
receiving a request from a path computation client for computation of a path between end nodes, the request identifying the end nodes and a transmission parameter that is supported by the end nodes, the transmission parameter including a bit rate and a plurality of modulation formats;
determining a plurality of values of the transmission parameter supported by the end nodes;
computing one or more paths between the end nodes for the transmission parameter based on meeting a bit error rate (BER) below a set threshold, wherein the computing further comprises selecting one of the values of the transmission parameter that provides the path requiring a minimum number of frequency slots from the one or more paths computed; and
sending a reply to the path computation client, wherein the reply identifies the path computed between the end nodes and the reply identifies the selected value of the transmission parameter for the computed path.

* * * * *